United States Patent Office 3,257,435
Patented June 21, 1966

3,257,435
19-BISDIFLUORO PREGNANES
Albert Bowers and James C. Orr, Mexico City, Mexico, assignors to Syntex Corporation, Panama, Panama, a corporation of Panama
No Drawing. Filed Sept. 21, 1962, Ser. No. 225,396
20 Claims. (Cl. 260—397.45)

The present invention relates to novel cyclopentanophenanthrene compounds and to a process for the production thereof.

More particularly the present invention relates to 19,19-difluoro derivatives of cortical hormones.

The novel compounds of the present invention are represented by the following formulas

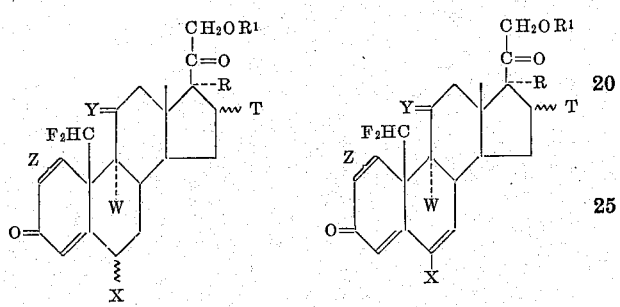

In the above formulas Z represents a double bond or a saturated linkage between C–1 and C–2; X represents hydrogen, fluorine or chlorine, all having α or β configurations; Y represents a β-hydroxyl or a keto group; W represents hydrogen, fluorine or chlorine; R represents a hydroxyl group; T represents hydrogen, α-hydroxy, α-acyloxy, α-methyl or β-methyl; T and R together represent the group

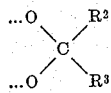

in the 16α,17α-positions, wherein $R^2$ and $R^3$ each represents hydrogen or a hydrocarbon residue of up to 8 carbon atoms of straight, branched, cyclic or mixed aliphatic-cyclic chain, or aromatic, such as methyl, ethyl, isopropyl, phenyl, methyl-cyclohexyl and the like; and $R^1$ represents hydrogen or a hydrocarbon carboxylic acyl group of less than 12 carbon atoms.

The acyl groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The compounds represented by the above formulas are valuable cortical hormones with high anti-inflammatory, low catabolic, glycogenic and thymolytic activities. In addition, they are anti-androgenic, anti-gonadotrophic and anti-estrogenic hormones. Furthermore, they have high topical activity in skin disorders such as psoriasis, allergic dermatitis and the like.

The novel compounds of the present invention are prepared by the process illustrated by the following formula scheme:

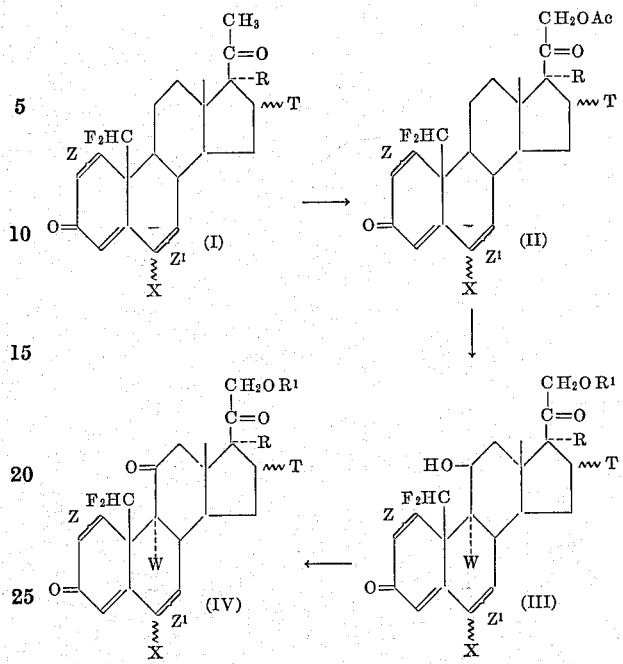

In the above formulae R, $R^1$, T, Z, W, and X have the same meaning as described hereinbefore; $Z^1$ may be a double or single bond between C–6 and C–7.

In practicing the process outlined above, a 19,19-difluoro-$\Delta^4$-pregnen-17α-ol-3,20-dione derivative (I) is treated with iodine in the presence of calcium oxide to give the corresponding 21-iodo derivative, which upon treatment with potassium acetate in a suitable solvent, such as acetone, preferably at reflux temperature, affords the corresponding 21-acetoxy-19,19-difluoro-$\Delta^4$-pregnen-17α-ol-3,20-dione derivative (II). The latter 3,20-dione upon incubation with adrenal glands in a suitable medium, e.g. an aqueous solution of alkali metal phosphates and chlorides and magnesium sulfate, mixed with an aqueous solution of fumaric acid and sodium hydroxide, for a period of time of the order of 3 hours, at approximately 28–37° C., yields the corresponding 19,19-difluoro-$\Delta^4$-pregnene-11β,17α,21-triol-3,20-dione derivative (III).

The latter 11β-ol (III) is treated with mesyl chloride in dimethylformamide and pyridine, at approximately 80° C., for about half an hour, to produce the corresponding 19,19-difluoro-$\Delta^{4,9(11)}$-pregnadiene-17α,21 diol - 3,20-dione derivative. The last mounted $\Delta^{4,9(11)}$-compound is treated with an N-bromoimide or amide, such as N-bromoacetamide, in the presence of perchloric acid, in an inert solvent, such as for example, dioxane, to give the corresponding $\Delta^4$9α-bromo-11β-ol which upon treatment with a mild base, such as potassium acetate, in a suitable solvent, e.g. acetone, preferably at reflux temperature, affords the corresponding 19,19-dichloro-9β,11β-oxido-$\Delta^4$-pregnene-17α, 21-diol-3,20-dione compound. The latter 9β,11β-oxido compound, upon treatment with a hydrogen halide, such as hydrogen fluoride or hydrogen chloride, in a suitable inert organic solvent, e.g. methylene chloride or chloroform, yields the corresponding 9α-halo-19,19-difluoro-$\Delta^4$-pregnene-11β,17α,21-triol-3,20-dione derivative (III: W=halogen).

The 11β-hydroxyl group present in several compounds of this invention (III) after previous conventional protection of the 21- and/or 16-hydroxyl groups, as by esterification, is oxidized, preferably with Jones reagent (chromium trioxide in sulfuric acid), thus affording the corresponding 11-ketone (IV).

The compounds of the present invention having a 16α, 17α-cyclic acetal or ketal grouping, yield the corresponding 16α, 17α-diols by conventional treatment with a strong acid, such as formic acid. The obtained diols, upon conventional esterification in pyridine with an acylating agent, as for example acetic anhydride or caproic anhydride, afford the corresponding 16-acylates.

The 16α, 17α-diols upon conventional condensation with a ketone or aldehyde, such as benzaldehyde, acetophenone, methyl ethyl ketone, acetone, and the like, in the presence of an acid, yield the corresponding 16α, 17α-methylenedioxy derivatives wherein the substituents on the methylenedioxy group may be different from those of the previously hydroylzed cyclic acetal or ketal grouping.

The compound of the present invention having a 21-acyloxy group may be saponified by conventional treatment with the base to produce the corresponding 21-free alcohols which, in turn, may be acylated conventionally in pyridine with an acylating agent to give the corresponding 21-acylates, wherein the acyl group may be different from the previously saponified one.

The following specific examples serve to illustrate the present invention, but are not intended to limit the scope thereof:

Example I

A cooled solution of 4 g. of 19,19-difluoro-$\Delta^4$-pregnene-17α-ol-3,20-dione (obtained according to our copending U.S. patent application Serial No. 225,364, filed September 21, 1962), in 30 cc. of tetrahydrofuran and 18 cc. of methanol was treated under continuous stirring with 6 g. of pure calcium oxide, in small portions, and then with 6 g. of iodine. The stirring was continued at room temperature until the solution turned pale yellow. The mixture was poured into ice water containing 18 cc. of acetic acid and 2 g. of solution thiosulfate. After stirring for 15 minutes the solution was decanted and the precipitate was collected by filtration, thus giving the 21-iodo derivative of the starting material.

This compound was mixed with 80 cc. of acetone and 12 g. of recently fused potassium acetate and the mixture was refluxed for 8 hours, concentrated to a small volume, diluted with water and extracted with ethyl acetate; the extract was washed with water, dried over anhydrous sodium sulfate and concentrated until crystallization started. The precipitate was collected and crystallized from methanol-water, thus yielding 21-acetoxy 19,19-difluoro-$\Delta^4$-pregnene-17α-ol-3,20-dione (compound No. 1).

Following exactly the same procedure, the starting compounds listed under I (obtained in accordance with our aforesaid patent application) were respectively converted into the corresponding products set forth under II.

Example II

The following solution "A," "B" and "C" were prepared using distilled water as solvent: solution "A" was prepared by mixing 425 cc. of a 1.742% dipotassic phosphate solution ($K_2HPO_4$) with 75 cc. of 1.38% monosodic phosphate; solution "B" was prepared by diluting a mixture of 1 lt. of 4.5% sodium chloride solution, 40 cc. of a 5.75% potassium chloride solution and 10 cc. of a 19.1% magnesium sulfate, to a volume of 5 lt.; solution "C" was prepared by dissolving 20.9 g. of fumaric acid and 14.4 g. of sodium hydroxide in 1 lt. of water and diluting the solution to 1.2 lt. Then 475 cc. of solution "A," 4.32 lt. of solution "B" and 1.2 lt. of solution "C" were mixed.

Adrenal glands of recently slaughtered cattle, defatted, were ground in a meat grinder until a homogeneous mass was obtained; to 1 kg. of homogenate was added 2 liters of the mixture of A, B, and C solutions with vigorous stirring. To the mixture there was then added 1 g. of 19,19-difluoro-$\Delta^4$-pregnene-17α,21-diol-3,20-dione, obtained by conventional saponification of compound No. 1, dissolved in 5.35 parts of propyleneglycol, the mixture was stirred at 28–37° C. for 3 hours, 13 liters of acetone were added and the mass was stirred at room temperature for an additional 1 hour.

The acetone extract was separated by filtration, the ground adrenals were washed with 6 liters of acetone, the extracts were combined and the solvent removed by distillation under reduced pressure. The residue was treated conventionally with 2 cc. of acetic anhydride in 5 cc. of pyridine at room temperature overnight. It was then poured into water and the produced precipitate crystallized, to give 21-acetoxy-19,19-difluoro-$\Delta^4$-pregnene-11β,17α-diol-3,20-dione (compound No. 14).

By the same procedure, the compounds Nos. 2 to 13, inclusive, were firstly saponified and thereafter respectively converted into—

Compound No.:
15. 21-acetoxy-19,19-difluoro-16α-methyl-$\Delta^4$-pregnene-11β,17α-diol-3,20-dione.
16. 21-acetoxy-19,19-difluoro-16β-methyl-$\Delta^4$-pregnene-11β,17α-diol-3,20-dione.
17. 21-acetoxy-19,19-difluoro-$\Delta^{1,4}$-pregnadiene-11β,17α-diol-3,20-dione.
18. 21-acetoxy-19,19-difluoro-16α-methyl-$\Delta^{1,4}$-pregnadiene-11β,17α-diol-3,20-dione.
19. 21-acetoxy-19,19-difluoro-16β-methyl-$\Delta^{1,4}$-pregnadiene-11β-17α-diol-3,20-dione.
20. 21-acetoxy-19,19-difluoro-16α-methyl-$\Delta^{4,6}$-pregnadiene-11β,17α-diol-3,20-dione.
21. 21-acetoxy-6β-chloro-19,19-difluoro-16α-methyl-$\Delta^4$-pregnene-11β,17α-diol-3,20-dione.

| I | Compound No. | II |
|---|---|---|
| 19,19-difluoro-16α-methyl-$\Delta^4$-pregnene-17α-ol-3,20-dione. | 2 | 21-acetoxy-19,19-difluoro-16α-methyl-$\Delta^4$-pregnene-17α-ol-3,20-dione. |
| 19,19-difluoro-16β-methyl-$\Delta^4$-pregnene-17α-ol-3,20-dione. | 3 | 21-acetoxy-19,19-difluoro-16β-methyl-$\Delta^4$-pregnene-17α-ol-3,20-dione. |
| 19,19-difluoro-$\Delta^{1,4}$-pregnadiene-17α-ol-3,20-dione. | 4 | 21-acetoxy-19,19-difluoro-$\Delta^{1,4}$-pregnadiene-17α-ol-3,20-dione. |
| 19,19-difluoro-16α-methyl-$\Delta^{1,4}$-pregnadiene-17α-ol-3,20-dione. | 5 | 21-acetoxy-19,19-difluoro-16α-methyl-$\Delta^{1,4}$-pregnadiene-17α-ol-3,20-dione. |
| 19,19-difluoro-16β-methyl-$\Delta^{1,4}$-pregnadiene-17α-ol-3,20-dione. | 6 | 21-acetoxy-19,19-difluoro-16β-methyl-$\Delta^{1,4}$-pregnadiene-17α-ol-3,20-dione. |
| 19,19-difluoro-16α-methyl-$\Delta^{4,6}$-pregnadiene-17α-ol-3,20-dione. | 7 | 21-acetoxy-19,19-difluoro-16α-methyl-$\Delta^{4,6}$-pregnadiene-17α-ol-3,20-dione. |
| 6β-chloro-19,19-difluoro 16α-methyl-$\Delta^4$-pregnene-17α-ol-3,20-dione. | 8 | 21-acetoxy-6β-chloro-19,19-difluoro-16α-methyl-$\Delta^4$-pregnene-17α-ol-3,20-dione. |
| 6β,19,19-trifluoro-16α-methyl-$\Delta^4$-pregnene-17α-ol-3,20-dione. | 9 | 21-acetoxy-6β,19,19-trifluoro-16α-methyl-$\Delta^4$-pregnene-17α-ol-3,20-dione. |
| 6α-chloro-19,19-difluoro-16α-methyl-$\Delta^4$-pregnene-17α-ol-3,20-dione. | 10 | 21-acetoxy-6α-chloro-19,19-difluoro-16α-methyl-$\Delta^4$-pregnene-17α-ol-3,20-dione. |
| 6α,19,19-trifluoro-16α-methyl-$\Delta^4$-pregnene-17α-ol-3,20-dione. | 11 | 21-acetoxy-6α,19,19-trifluoro-16α-methyl-$\Delta^4$-pregnene-17α-ol-3,20-dione. |
| 6α-chloro-19,19-difluoro-16α-methyl-$\Delta^{1,4}$-pregnadiene-17α,ol-3,20-dione. | 12 | 21-acetoxy-6α-chloro-19,19-difluoro-16α-methyl-$\Delta^{1,4}$-pregnadiene-17α-ol-3,20-dione. |
| 6-chloro-19,19-difluoro-16α-methyl-$\Delta^{4,6}$-pregnadiene-17α-ol-3,20-dione. | 13 | 21-acetoxy-6-chloro-19,19-difluoro-16α-methyl-$\Delta^{4,6}$-pregnadiene-17α-ol-3,20-dione. |

Compound No.:
22. 21-acetoxy-6β,19,19-trifluoro-16α-methyl-Δ$^4$-pregnene-3,20-dione.
23. 21-acetoxy-6α-chloro-19,19-difluoro-16α-methyl-Δ$^4$-pregnene-11β,17α-diol-3,20-dione.
24. 21-acetoxy-6α,19,19-trifluoro-16α-methyl-Δ$^4$-pregnene-11β,17α-diol-3,20-dione.
25. 21-acetoxy-6α-chloro-19,19-difluoro-16α-methyl-Δ$^{1,4}$-pregnadiene-11β,17α-diol-3,20-dione.
26. 21-acetoxy-6-chloro-19,19-difluoro-16α-methyl-Δ$^{4,6}$-pregnadiene-11β,17α-diol-3,20-dione.

*Example III*

A solution of 1 g. of 21-acetoxy-19,19-difluoro-Δ$^4$-pregnene-11β,17α-diol-3,20-dione (Cpd. No. 14) in 10 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave 21-acetoxy-19,19-difluoro-Δ$^4$-pregnene-17α-ol - 3,11,20 - trione (Cpd. No. 27).

Following the same procedure, there were treated the compounds Nos. 15 to 26, inclusive, thus affording respectively—

Compound No.:
28. 21-acetoxy-19,19-difluoro-16α-methyl-Δ$^4$-pregnene-17α-ol-3,11,20-trione.
29. 21-acetoxy-19,19-difluoro-16β-methyl-Δ$^4$-pregnene-17α-ol-3,11,20-trione.
30. 21-acetoxy-19,19-difluoro-Δ$^{1,4}$-pregnadiene-17α-ol-3,11,20-trione.
31. 21-acetoxy-19,19-difluoro-16α-methyl-Δ$^{1,4}$-pregnadiene-17α-ol-3,11,20-trione.
32. 21-acetoxy-19,19-difluoro-16β-methyl-Δ$^{1,4}$-pregnadiene-17α-ol-3,11,20-trione.
33. 21-acetoxy-19,19-difluoro-16α-methyl-Δ$^{4,6}$-pregnadiene-17α-ol-3,11,20-trione.
34. 21-acetoxy-6β-chloro-19,19-difluoro-16α-methyl-Δ$^4$-pregnene-17α-ol-3,11,20-trione.
35. 21-acetoxy-6β,19,19-trifluoro-16α-methyl-Δ$^4$-pregnene-17α-ol-3,11,20-trione.
36. 21-acetoxy-6α-chloro-19,19-difluoro-16α-methyl-Δ$^4$-pregnene-17α-ol-3,11,20-trione.
37. 21-acetoxy-6α,19,19-trifluoro-16α-methyl-Δ$^4$-pregnene-17α-ol-3,11,20-trione.
38. 21-acetoxy-6α-chloro-19,19-difluoro-16α-methyl-Δ$^{1,4}$-pregnadiene-17α-ol-3,11,20-trione.
39. 21-acetoxy-6-chloro-19,19-difluoro-16α-methyl-Δ$^{4,6}$-pregnadiene-17α-ol-3,11,20-trione.

*Example IV*

2 g. of 21-acetoxy-19,19-difluoro-Δ$^4$-pregnene-11β,17α-diol-3,20-dione (Cpd. No. 14) was dissolved in 50 cc. of methanol and treated with 5 cc. of a 4% aqueous solution of potassium hydroxide; the reaction mixture was stirred for 1 hour under an atmosphere of nitrogen at 0° C.; the mixture was neutralized with acetic acid and the methanol distilled under reduced pressure. The residue was triturated with water and the solid collected, washed with water, dried and recrystallized from ethyl acetate-methanol, thus producing 19,19-difluoro-Δ$^4$-pregnene-11β,17α,21-triol-3,20-dione (Cpd. No. 40).

The compounds Nos. 15 to 39, inclusive, were treated following the above procedure thus giving respectively—

Compound No.:
41. 19,19-difluoro-16α-methyl-Δ$^4$-pregnene-11β,17α,21-triol-3,20-dione.
42. 19,19-difluoro-16β-methyl-Δ$^4$-pregnene-17β,17α,21-triol-3,20-dione.
43. 19,19-difluoro-Δ$^{1,4}$-pregnadiene-11β,17α-21-triol-3,20-dione.
44. 19,19-difluoro-16α-methyl-Δ$^{1,4}$-pregnadiene-11β,17α,21-triol-3,20-dione.
45. 19,19-difluoro-16β-methyl-Δ$^{1,4}$-pregnadiene-11β,17α,21-triol-3,20-dione.
46. 19,19-difluoro-16α-methyl-Δ$^{4,6}$-pregnadiene-11β,17α,21-triol-3,20-dione.
47. 6β-chloro-19,19-difluoro-16α-methyl-Δ$^4$-pregnene-11β,17α,21-triol-3,20-dione.
48. 6β,19,19-trifluoro-16α-methyl-Δ$^4$-pregnene-11β,17α,21-triol-3,20-dione.
49. 6α-chloro-19,19-difluoro-16α-methyl-Δ$^4$-pregnene-11β,17α,21-triol-3,20-dione.
50. 6α,19,19-trifluoro-16α-methyl-Δ$^4$-pregnene-11β,17α-21-triol-3,20-dione.
51. 6α-chloro-19,19-difluoro-16α-methyl-Δ$^{1,4}$-pregnadiene-11β,17α,21-triol-3,20-dione.
52. 6-chloro-19,19-difluoro-16α-methyl-Δ$^{4,6}$-pregnadiene-11β,17α,21-triol-3,20-dione.
53. 19,19-difluoro-Δ$^4$-pregnene-17α,21-diol-3,11,20-trione.
54. 19,19-difluoro-16α-methyl-Δ$^4$-pregnene-17α,21-diol-3,11,20-dione.
55. 19,19-difluoro-16β-methyl-Δ$^4$-pregnene-17α,21-diol-3,11,20-trione.
56. 19,19-difluoro-Δ$^{1,4}$-pregnadiene-17α,21-diol,3,11,20-trione.
57. 19,19-difluoro-16α-methyl-Δ$^{1,4}$-pregnadiene-17α,21-diol-3,11,20-trione.
58. 19,19-difluoro-16β-methyl-Δ$^{1,4}$-pregnadiene-17α,21-diol-3,11,20-trione.
59. 19,19-difluoro-16α-methyl-Δ$^{4,6}$-pregnadiene-17α,21-diol-3,11,20-trione.
60. 6β-chloro-19,19-difluoro-16α-methyl-Δ$^4$-pregnene-17α,21-diol-3,11,20-trione.
61. 6β,19,19-trifluoro-16α-methyl-Δ$^4$-pregnene-17α,21-diol-3,11,20-trione.
62. 6α-chloro-19,19-difluoro-16α-methyl-Δ$^4$-pregnene-17α,21-diol-3,11,20-trione.
63. 6α,19,19-trifluoro-16α-methyl-Δ$^4$-pregnene-17α-21-diol-3,11,20-trione.
64. 6α-chloro-19,19-difluoro-16α-methyl-Δ$^{1,4}$-pregnadiene-17α,21-diol-3,11,20-trione.
65. 6-chloro-19,19-difluoro-16α-methyl-Δ$^{4,6}$-pregnadiene-17α,21-diol-3,11,20-trione.

*Example V*

A mixture of 1 g. of 19,19-difluoro-Δ$^4$-pregnene-11β,17α,21-triol-3,20-dione (Cpd. No. 40), 4 cc. of pyridine and 2 cc. of caproic anhydride was kept at room temperature overnight, poured into ice water, the formed precipitate was filtered, washed with water and dried. Crystallization from acetone-hexane gave 19,19-difluoro-Δ$^4$-pregnene - 11β,17α - 21 - triol - 3,20 - dione 21 caproate (Cpd. No. 66).

The compound No. 53 was treated by the same procedure, thus affording 19,19-difluoro-Δ$^4$-pregnene-17α,21-diol-3,11,20-trione 21-caproate (Cpd. No. 67).

*Example VI*

19,19 - difluoro - 16α,17α - isopropylidenedioxy - Δ$^4$-pregnene-3,20-dione (obtained in accordance with our aforesaid U.S. patent application) was treated successively according to Examples I, II, and III, thus yielding respectively: 21-acetoxy-19,19-difluoro-16α,17α-isopropylidenedioxy-Δ$^4$-pregnene-3,20-dione (Cpd. No. 68), 21-acetoxy - 19,19 - difluoro - 16α,17α - isopropylidenedioxy-Δ$^4$-pregnene-11β-ol-3,20-dione (Cpd. No. 69) and 21-acetoxy - 19,19 - difluoro - 16α,17α - isopropylidenedioxy-Δ$^4$-pregnene-3,11,20-trione (Cpd. No. 70).

Example VII

The compounds Nos. 69 and 70, were treated in accordance with Example IV thus affording respectively: 19,19 - difluoro - 16α,17α - isopropylidenedioxy - Δ⁴-pregnene-11β,21-diol-3,20-dione (Cpd. No. 71) and 19,19-difluoro - 16α,17α - isopropylidenedioxy - Δ⁴ - pregnene-21-ol-3,11,20-trione (Cpd. No. 72).

Example VIII 1 g. of 19,19-difluoro-16α,17α-isopropylidenedioxy-Δ⁴-pregnene-11β,21-diol-3,20-dione (Cpd. No. 71) was heated on the steam bath with 20 cc. of 60% formic acid for 1 hour, cooled, diluted with water and the precipitate was collected, washed with water, dried, and recrystallized from acetone-hexane, thus affording 19,19-difluoro - Δ⁴ - pregnene - 11β,16α,17α,21 - tetrol - 3,20-dione (Cpd. No. 73).

Following the same procedure compound No. 72 was converted into 19,19-difluoro-Δ⁴-pregnene-16α,17α,21-triol-3,11,20-trione (Cpd. No. 74).

Example IX

The compounds Nos. 73 and 74 were treated in accordance with Example V thus affording respectively: 19,19-difluoro - Δ⁴ - pregnene - 11β,16α,17α,21 - tetrol - 3,20-dione 16,21-dicaproate (Cpd. No. 75) and 19,19-difluoro-Δ⁴ - pregnene - 16α,17α,21 - triol - 3,11,20-trione 16,21 dicaproate (Cpd. No. 76).

Example X 19,19 - difluoro-16α,17α - isopropylidenedioxy - Δ¹,⁴,⁶-pregnatriene-3,20-dione (obtained in accordance with our aforementioned application) was treated following successively the procedures described in Examples I, II and III, thus yielding respectively: 21-acetoxy-19,19-difluoro-16α,17α-isopropylidenedioxy - Δ¹,⁴,⁶ - pregnatriene-3,20-dione (Cpd. No. 77), 21-acetoxy-19,19-difluoro-16α,17α-isopropylidenedioxy - Δ¹,⁴,⁶ - pregnatriene - 11β-ol-3,20-dione (Cpd. No. 78) and 21-acetoxy-19,19-difluoro-16α,17α-isopropylidenedioxy - Δ¹,⁴,⁶-pregnatriene-3,11,20-trione (Cpd. No. 79).

Example XI

The compounds Nos. 78 and 79 were treated in accordance with Example IV, thus yielding respectively: 19,19-difluoro-16α,17α - isopropylidenedioxy - Δ¹,⁴,⁶-pregnatriene-11β,21-diol-3,20-dione (Cpd. No. 80) and 19,19-difluoro-16α,17α - isopropylidenedioxy - Δ¹,⁴,⁶-pregnatriene-21-ol-3,11,20-trione (Cpd. No. 81).

Example XII

The compounds Nos. 80 and 81 were treated in accordance with Example VIII, thus yielding respectively: 19,19-difluoro-Δ¹,⁴,⁶ - pregnatriene-11β,16α,17α,21-tetrol-3,20-dione (Cpd. No. 82) and 19,19-difluoro-Δ¹,⁴,⁶-pregnatriene-16α,17α,21-triol-3,11,20-trione (Cpd. No. 83).

Example XIII 10 g. of 21-acetoxy - 19,19 - difluoro-Δ⁴-pregnene-11β,17α-diol-3,20-dione (Cpd. No. 14) was dissolved with slow heating in 125 cc. of dimethyl-formamide, the mixture was cooled, 4.2 g. of mesyl chloride and 5 cc. of pyridine were added and the solution was kept at 80° C. for half an hour. The reaction mixture was cooled, water was added and the product was extracted with ethyl acetate. The extract was washed with water, dried over anhydrous sodium sulfate and the solvent was evaporated. Recrystallization of the residue from acetone-hexane furnished 21-acetoxy-19,19-difluoro-Δ⁴,⁹⁽¹¹⁾ - pregnadien-17α-ol-3,20-dione (Cpd. No. 84).

2.8 g. of N-bromoacetamide were added to a mixture of 5 g. of compound No. 84, 50 cc. of pure dioxane and 0.8 cc. of 0.4 N perchloric acid while stirring in the dark and at room temperature during 1 hour. The reaction mixture was stirred for 1 hour further, a solution of 10% sodium sulfate was then added until the potassium-starch indicator paper no longer turned blue, ice was added, the mixture was extracted with chloroform and the extract was washed consecutively with water, 5% aqueous sodium bicarbonate solution and water, and the solvent was removed by distillation under vacuo. By trituration of the residue with acetone there was obtained the corresponding 9α-bromo-11β-hydroxy derivative.

A mixture of 2 g. of anhydrous potassium acetate and 20 cc. of acetone was heated almost to boiling and then a solution of 1.7 g. of the above bromohydrin in 20 cc. of acetone was added slowly while stirring; the mixture was then refluxed for 10 hours, cooled and almost all of the acetone was distilled off; iced-water was then added, the precipitate was filtered, washed with water and dried. Upon recrystallization from methylene chloride-benzene there was obtained 21 - acetoxy - 19,19 - difluoro-9β,11β-oxido-Δ⁴-pregnen-17α-ol-3,20-dione (Cpd. No. 85).

In a polyethylene flask, adapted with magnetic stirrer, there was dissolved 1 g. of Compound No. 85 in 30 cc. of methylene chloride, the solution was cooled to 0° C. and a solution of 2.11 g. of anhydrous hydrogen fluoride in 3.7 cc. of tetrahydrofurane cooled in a Dry Ice acetone bath (−70° C.) was added over a period of 20 minutes with constant stirring. The mixture was stirred at a temperature lower than 10° C. for 6 additional hours, then neutralized by cautiously adding a 5% aqueous sodium bicarbonate solution and transferred to a separatory funnel. The organic layer was washed with water, dried over anhydrous sodium sulfate and concentrated until formation of an abundant precipitate. The mixture was cooled, the precipitate filtered and redissolved in hot ethyl acetate, the insoluble material was filtered off and the filtrate cooled whereby the recrystallized 21-acetoxy-9α,19,19-trifluoro-Δ⁴-pregnene - 11β,17α - diol-3,20-dione (Cpd. No. 86).

The Compounds Nos. 15 to 26, inclusive, upon treatment by the above sequence of reaction afforded the corresponding 9α-fluoro derivatives.

Example XIV

To a solution of 4 g. of Compound No. 85 in 40 cc. of anhydrous chloroform, was added, over a period of 35 minutes 30 cc. of a 0.45 N solution of dry hydrogen chloride in chloroform, under continuous stirring and maintaining the temperature around 0° C. The mixture was then stirred at 0° C. for 1 hour further, diluted with water and the chloroform layer was separated, washed with aqueous sodium bicarbonate solution and then with water, dried over anhydrous sodium sulfate and evaporated under reduced pressure. Crystallization of the residue from acetone-hexane gave 21-acetoxy-9α-chloro-19,19-difluoro-Δ⁴-pregnene-11β,17α-diol-3,20-dione (Cpd. No. 87).

By the same procedures there were obtained the 9α-chloro derivatives of compounds Nos. 15 to 26, inclusive.

Example XV

The compounds Nos. 86 and 87 were treated following the procedure of Example III, thus giving respectively: 21 - acetoxy-9α,19,19-trifluoro-Δ⁴-pregnen-17α-ol-3,11,20-trione (Cpd. No. 88) and 21-acetoxy-9α-chloro-19,19-difluoro-Δ⁴-pregnen-17α-ol-3,11,20-trione (Cpd. No. 89).

Example XVI

The compounds Nos. 86, 87, 88 and 89 were treated in accordance with Example IV, thus giving the corresponding free 21-alcohols.

Example XVII

A mixture of 1 g. of compound No. 73, 50 cc, of freshly distilled acetophenone and 0.5 cc. of 72% perchloric acid was stirred at room temperature for 1 hour. The resulting mixture was washed with sodium bicarbonate solution and with water to neutrality, then it was steam distilled and the product extracted with methylene chloride. The extract was dried over anhydrous sodium sulfate and evaporated to dryness. Crystallization from acetone-hexane yielded the 16,17-acetophenonide of 19,19-difluoro - Δ⁴ - pregnene - 11β,16α,17α,21 - tetrol - 3,20-dione (Cpd. No. 90).

By the same procedure there were obtained the 16,17-acetophenonides of compound Nos. 74, 82, and 83.

*Example XVIII*

The compound No. 69 was treated in accordance with the procedure of Example XIII, thus affording as final compound 21-acetoxy-9α,19,19-trifluoro 16α,17a-isopropylidenedioxy - Δ⁴ - pregnene - 11β - ol - 3,20 - dione (Cpd. No. 91).

*Example XIX*

The compound No. 91 was treated successively according to Examples IV and VIII, thus furnishing respectively 9α,19,19 - trifluoro - 16α,17α - isopropylidenedioxy-Δ⁴-pregnene-11β,21-diol-3,20-dione (Cpd. No. 92) and 9α,19,19 - trifluoro - Δ⁴ - pregnene - 11β,16α,17α,21-tetrol-3,20-dione (Cpd. No. 93).

We claim:
1. A compound of the following formula:

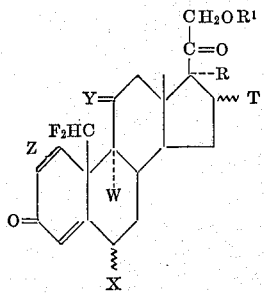

wherein Z is selected from the group consisting of a double bond and a saturated linkage between C-1 and C-2; X is a member of the group consisting of hydrogen, α-fluorine, β-fluorine, α-chlorine and β-chlorine; Y is selected from the group consisting of β-hydroxyl and keto; R is a hydroxyl group; T is a member of the group consisting of hydrogen, α-hydroxy, α-hydrocarbon carboxylic acyloxy group of less than 12 carbon atoms, α-methyl and β-methyl; R and T together represent the group

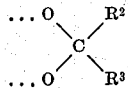

wherein R² and R³ are selected from the group consisting of hydrogen and a hydrocarbon residue of up to 8 carbon atoms; R¹ is selected from the group consisting of hydrogen and a hydrocarbon carboxylic acyl group of less than 12 carbon atoms; and W is selected from the group consisting of hydrogen, fluorine and chlorine.

2. 19,19 - difluoro - Δ⁴ - pregnene - 11β,17α,21 - triol-3,20-dione.

3. 19,19 - difluoro - 16α - methyl - Δ⁴ - pregnene - 11β,17α,21-triol-3,20-dione.

4. 19,19 - difluoro - 16β - methyl - Δ⁴ - pregnene - 11β,17α,21-triol-3,20-dione.

5. 19,19 - difluoro - Δ¹,⁴ - pregnadiene - 11β,17α,21-triol-3,20-dione.

6. 19,19 - difluoro - 16α - methyl - Δ¹,⁴ - pregnadiene-11β,17α,21-triol-3,20-dione.

7. 19,19 - difluoro - 16β - methyl - Δ¹,⁴ - pregnadiene-11β,17α,21-triol-3,20-dione.

8. 6α - chloro - 19,19 - difluoro - 16α - methyl - Δ⁴-pregnene-11β,17α,21-triol-3,20-dione.

9. 6α,19,19 - trifluoro - 16α - methyl - Δ⁴ - pregnene-11β,17α,21-triol-3,20-dione.

10. 19,19 - difluoro - Δ⁴ - pregnene - 7α,21 - diol - 3,11,20-trione.

11. 19,19 - difluoro - 16α - methyl - Δ⁴ - pregnene-17α,21-diol-3,11,20-trione.

12. 19,19 - difluoro - 16β - methyl - Δ⁴ - pregnene-17α,21-diol-3,11,20-trione.

13. 19,19 - difluoro - Δ¹,⁴ - pregnadiene - 17α,21 - diol-3,11,20-trione.

14. 19,19 - difluoro - 16α - methyl - Δ¹,⁴ - pregnadiene-17α,21-diol-3,11,20-trione.

15. 19,19 - difluoro - 16β - methyl - Δ¹,⁴ - pregnadiene-17α,21-diol-3,11,20-trione.

16. 6α - chloro - 19,19 - difluoro - 16α - methyl - Δ⁴-pregnene-17α,21-diol-3,11,20-trione.

17. 6α,19,19 - trifluoro - 16α - methyl - Δ⁴ - pregnene-17α,21-diol-3,11,20-trione.

18. A compound of the following formula:

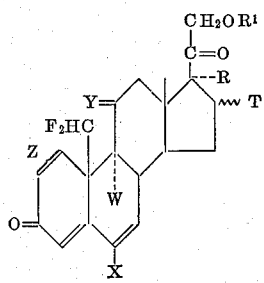

wherein Z is selected from the group consisting of a double bond and a saturated linkage between C-1 and C-2; X is a member of the group consisting of hydrogen, fluorine and chlorine; Y is selected from the group consisting of β-hydroxyl and keto; R is a hydroxyl group; T is a member of the group consisting of hydrogen, α-hydroxy, α-hydrocarbon carboxylic acyloxy group of less than 12 carbon atoms, α-methyl and β-methyl; R and T together represent the group

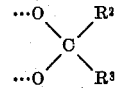

wherein R² and R³ are selected from the group consisting of hydrogen and a hydrocarbon residue of up to 8 carbon atoms; R¹ is selected from the group consisting of hydrogen and a hydrocarbon carboxylic acyl group of less than 12 carbon atoms; and W is selected from the group consisting of hydrogen, fluorine and chlorine.

19. 19,19 - difluoro - 16α - methyl - Δ⁴,⁶ - pregnadiene-11β,17α,21-triol-3,20-dione.

20. 19,19 - difluoro - 16α - methyl - Δ⁴,⁶ - pregnadiene-17α,21-diol-3,11,20-trione.

No references cited.

LEWIS GOTTS, *Primary Examiner.*